United States Patent
Park et al.

(10) Patent No.: US 9,639,785 B2
(45) Date of Patent: May 2, 2017

(54) METHOD OF COMPENSATING DENSITY AND IMAGE FORMING APPARATUS PERFORMING THE SAME

(71) Applicant: SAMSUNG ELECTRONICS CO., LTD., Suwon (KR)

(72) Inventors: Eun-seok Park, Goyang (KR); Jong-cheol Oh, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 13/933,724

(22) Filed: Jul. 2, 2013

(65) Prior Publication Data

US 2014/0111833 A1    Apr. 24, 2014

(30) Foreign Application Priority Data

Oct. 24, 2012    (KR) .................. 10-2012-0118673

(51) Int. Cl.
| | |
|---|---|
| G03G 15/00 | (2006.01) |
| G06K 15/02 | (2006.01) |
| H04N 1/60 | (2006.01) |
| H04N 1/407 | (2006.01) |

(52) U.S. Cl.
CPC ......... G06K 15/027 (2013.01); H04N 1/4078 (2013.01); H04N 1/6033 (2013.01); H04N 1/407 (2013.01)

(58) Field of Classification Search
USPC ................... 399/27, 49, 61, 64, 74, 98
See application file for complete search history.

(56) References Cited

U.S. PATENT DOCUMENTS

| | | | |
|---|---|---|---|
| 6,847,791 B2 * | 1/2005 | Kitagawa et al. | ............... 399/49 |
| 8,315,673 B2 | 11/2012 | Gum | |
| 2003/0090688 A1 * | 5/2003 | Kimura | .......................... 358/1.9 |

(Continued)

FOREIGN PATENT DOCUMENTS

| | | |
|---|---|---|
| CN | 101276170 | 10/2008 |
| JP | 2006064895 A * | 3/2006 |

(Continued)

OTHER PUBLICATIONS

JP2006-064895A English Machine Translation available from JPO website.*

(Continued)

*Primary Examiner* — Minh Phan
(74) *Attorney, Agent, or Firm* — Staas & Halsey LLP

(57) ABSTRACT

An image forming apparatus according to the present general inventive concept includes a transfer unit configured to transfer an image formed on a photoreceptor to a transfer medium, a power supply unit configured to supply transfer power to the transfer unit, a density sensor unit configured to sense a density of the image transferred to the transfer medium, and a control unit configured to control the power supply unit so that the transfer power supplied to the transfer unit is adjusted, wherein the density sensor unit is allowed to move from a first position for sensing a density of sample patches formed on the transfer medium to a second position for sensing a density of a reference reflective plate, and the control unit performs a sensor compensation mode and a density compensation mode.

19 Claims, 5 Drawing Sheets

(56) References Cited

U.S. PATENT DOCUMENTS

| | | |
|---|---|---|
| 2004/0042816 A1* | 3/2004 | Fukuda et al. .................. 399/98 |
| 2005/0141000 A1* | 6/2005 | Yamada et al. ................ 358/1.9 |
| 2006/0188277 A1 | 8/2006 | Nishida et al. |
| 2008/0218781 A1 | 9/2008 | Kim |
| 2009/0169233 A1* | 7/2009 | Hayakawa ..................... 399/74 |
| 2009/0202260 A1 | 8/2009 | Morikuni et al. |
| 2009/0202263 A1 | 8/2009 | Yoshida et al. |
| 2012/0038731 A1 | 2/2012 | Takahashi et al. |
| 2012/0148272 A1 | 6/2012 | Ramesh et al. |

FOREIGN PATENT DOCUMENTS

| | | |
|---|---|---|
| JP | 2007-17483 | 1/2007 |
| JP | 2007-256883 | 10/2007 |

OTHER PUBLICATIONS

International Search Report mailed Jan. 17, 2014 in corresponding International Application No. PCT/KR2013/009533.
Extended European Search Report dated Dec. 13, 2016 in European Patent Application No. 13172439.5.
Chinese Office Action dated Feb. 14, 2017 in Chinese Patent Application No. 201310507589.X.

\* cited by examiner

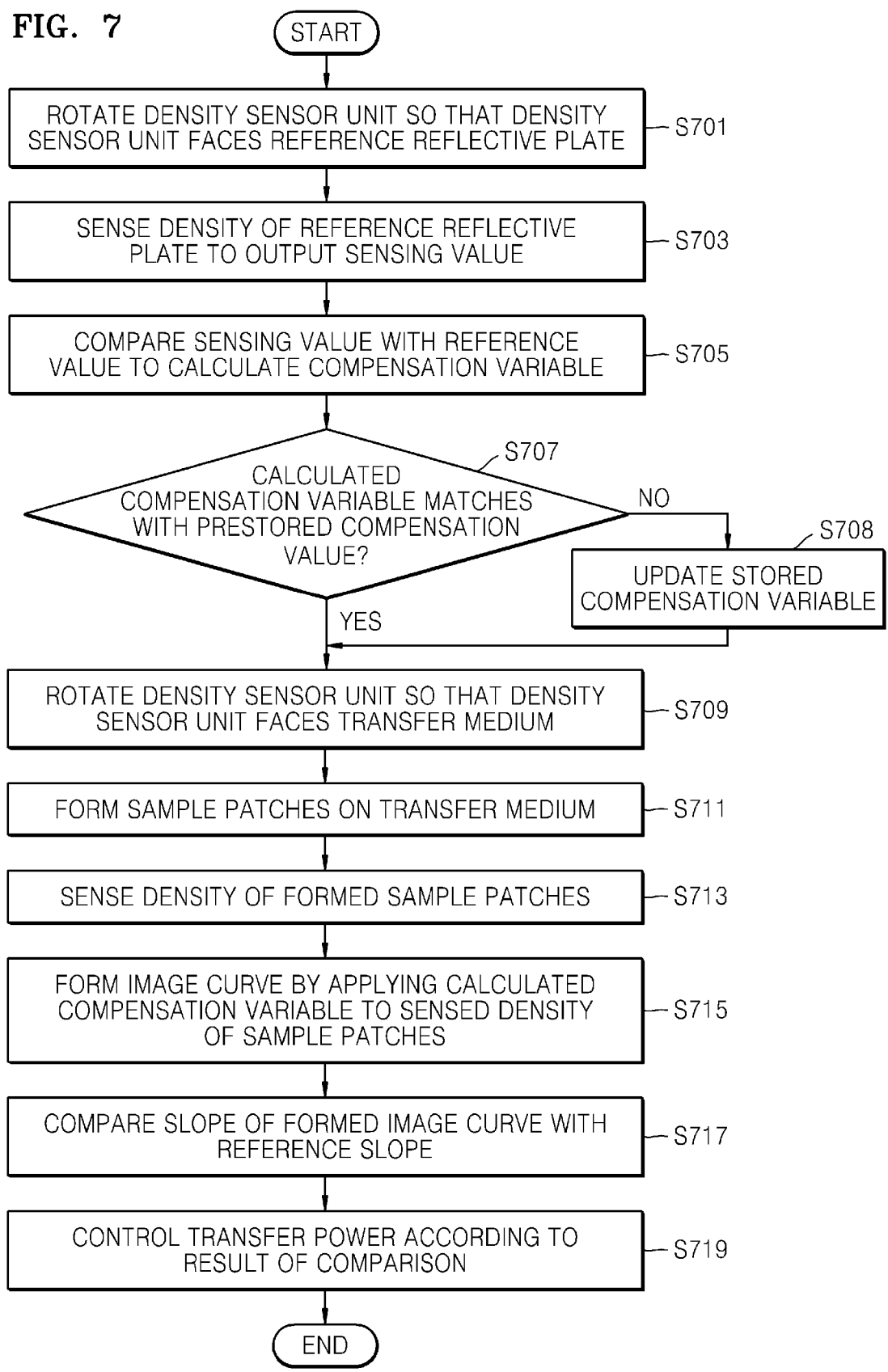

METHOD OF COMPENSATING DENSITY AND IMAGE FORMING APPARATUS PERFORMING THE SAME

CROSS-REFERENCE TO RELATED APPLICATIONS

This application claims the benefit of Korean Patent Application No. 10-2012-0118673, filed on Oct. 24, 2012, in the Korean Intellectual Property Office, the disclosure of which is incorporated herein in its entirety by reference.

BACKGROUND

1. Field

The present disclosure relates to a method of compensating density, and more particularly, to a method of compensating a sensing value of a density sensor which is used in the density compensation operation.

2. Description of the Related Art

An image forming apparatus forms an image on a photoreceptor by supplying a developer containing toner when an electrostatic latent image is formed on the photoreceptor through an exposure process, and then transfers the image formed on the photoreceptor to a transfer medium and fixes the image with heat and pressure, thereby performing printing.

However, when the image formed on the photoreceptor is transferred to the transfer medium, the image may not have a desired density due to environmental factors, such as temperature and humidity. To overcome this limitation, sample patches are formed on the transfer medium, and power supply for the transfer is adjusted according to values obtained by sensing a density of the sample patches, thereby performing density compensation.

However, when a sensing capability of a density sensor for sensing the density of the samples patches varies due to various environmental factors, sensing errors may occur and the density compensation may not be correctly performed. Therefore, the sensing capability of the density sensor needs to be maintained constant by compensating the sensing values of the density sensor.

SUMMARY

Additional aspects and/or advantages will be set forth in part in the description which follows and, in part, will be apparent from the description, or may be learned by practice of the invention.

The present disclosure provides a method of compensating density to minimize sensing errors.

According to an aspect, there is provided an image forming apparatus including: a transfer unit configured to transfer an image formed on a photoreceptor to a transfer medium; a power supply unit configured to supply transfer power to the transfer unit; a density sensor unit configured to sense a density of the image transferred to the transfer medium; and a control unit configured to control the power supply unit so that the transfer power supplied to the transfer unit is adjusted, wherein the density sensor unit is allowed to move from a first position for sensing a density of sample patches formed on the transfer medium to a second position for sensing a density of a reference reflective plate, and the control unit performs a sensor compensation mode, in which a sensing value of the density sensor unit is compensated according to a result of the density of the reference reflective plate sensed by the density sensor unit at the second position, and performs a density compensation mode in which the transfer power supplied to the transfer unit is adjusted according to the density of the sample patches sensed by the density sensor unit at the first position to thereby compensate the density of the image transferred to the transfer medium.

The density sensor unit may rotate with respect to a hinge provided to one side of the density sensor unit to move from the first position to the second position.

A distance between the density sensor unit and the transfer medium when the density sensor unit is located at the first position may be the same as that between the density sensor unit and the reference reflective plate when the density sensor unit is located at the second position.

The control unit may include: a sensor compensation unit configured to compare the density of the reference reflective plate sensed by the density sensor unit at the second position with a reference value and calculate a compensation variable; and a density compensation unit configured to perform density compensation by applying the calculated compensation variable to the density of the sample patches sensed by the density sensor unit at the first position.

The control unit may generate an image curve by using a value obtained by applying the compensation variable to the density of the sample patches, and may control the power supply unit so that the transfer power is adjusted according to a result of comparing a slope of the image curve with a predetermined (i.e. pre-stored) reference slope.

The sensor compensation unit may calculate the compensation variable by dividing the reference value by the sensed density of the reference reflective plate, and the density compensation unit may perform the density compensation by using a value obtained by multiplying the sensed density of the sample patches by the compensation variable.

A storage unit configured to store the compensation variable may be further included, wherein, when the compensation variable calculated by the sensor compensation unit does not match with the compensation variable stored in the storage unit, the compensation variable stored in the storage unit may be updated.

The control unit may perform the sensor compensation mode while a printing mode in which printing data is printed is performed.

The control unit may perform the sensor compensation mode right before performing the density compensation mode.

The reference reflective plate may have brightness of N3.5 or more of the Munsell color system.

According to one aspect, there is provided a method of compensating density for an image forming apparatus, including: performing a sensor compensation mode in which a sensing value of a density sensor unit is compensated; and performing a density compensation mode in which a density of an image formed on a transfer medium is compensated according to a result of sensing a density of sample patches formed on the transfer medium by using the density sensor unit, wherein the density sensor unit is located at a first position for sensing the density of the sample patches formed on the transfer medium when the density compensation mode is performed, and is located at a second position for sensing a density of a reference reflective plate when the sensor compensation mode is performed.

The density sensor unit may rotate with respect to a hinge provided to one side of the density sensor unit to move from the first position to the second position.

A distance between the density sensor unit and the transfer medium when the density sensor unit is located at the first position may be the same as that between the density sensor unit and the reference reflective plate when the density sensor unit is located at the second position.

The performing of the sensor compensation mode may include: moving the density sensor unit from the first position to the second position; sensing the density of the reference reflective plate; and comparing the sensed density of the reference reflective plate with a reference value to calculate a compensation variable.

The performing of the density compensation mode may include: moving the density sensor unit from the second position to the first position; forming the sample patches on the transfer medium; sensing the density of the formed sample patches; applying the calculated compensation variable to the sensed density of the sample patches; and compensating the density of the image formed on the transfer medium by adjusting transfer power according to the density of the sample patches to which the compensation variable is applied.

The compensating of the density of the image may include: generating an image curve by using a value obtained by applying the compensation variable to the density of the sample patches; comparing a slope of the image curve with a prestored reference slope; and adjusting the transfer power according to a result of the comparison.

The calculating of the compensation variable may include dividing the reference value by the sensed density of the reference reflective plate, and the compensating of the density of the image may include multiplying the sensed density of the sample patches by the compensation variable.

When the calculated compensation variable does not match with a prestored compensation variable, the predetermined compensation variable may be updated.

The sensor compensation mode may be performed while a printing mode in which printing data is printed is performed.

BRIEF DESCRIPTION OF THE DRAWINGS

The above and other features and advantages of the present disclosure will become more apparent by describing in detail exemplary embodiments thereof with reference to the attached drawings in which:

FIGS. 5 to 7 are flowcharts illustrating a method of compensating density, according to an embodiment.

DETAILED DESCRIPTION

The present disclosure will now be described more fully with reference to the accompanying drawings, in which exemplary embodiments are shown.

Figure 1:
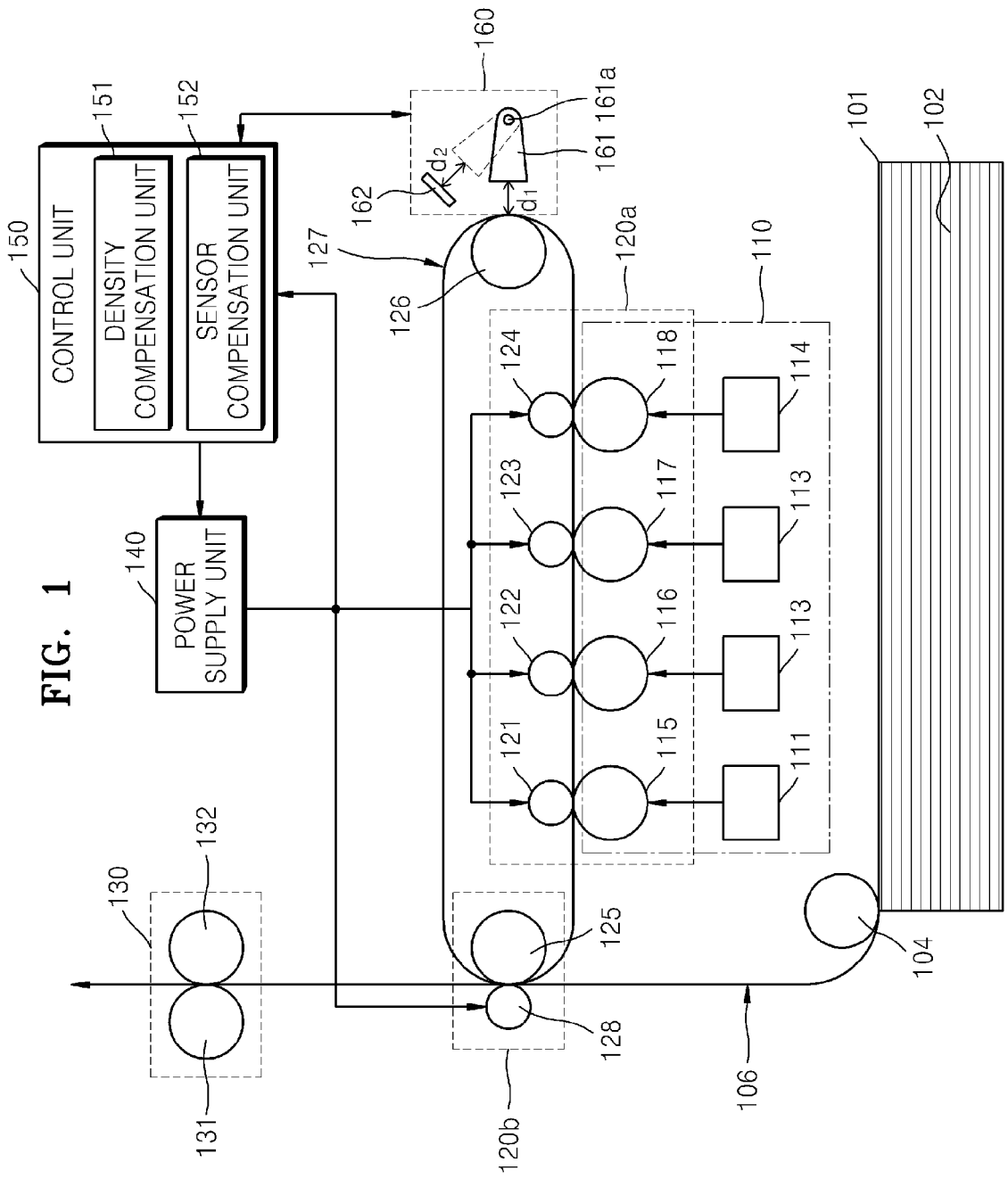
FIG. 1 is a diagram illustrating an image forming apparatus according to an embodiment.

FIG. 1 is a diagram illustrating an image forming apparatus according to an embodiment. Referring to FIG. 1, the image forming apparatus according to an embodiment may include a development unit 110, a transfer unit 120 including a primary transfer unit 120a and a secondary transfer unit 120b, a fusing unit 130, a power supply unit 140, a control unit 150, and a detection unit 160. The control unit 150 may include a density compensation unit 151 and a sensor compensation unit 152, and the detection unit 160 may include a density sensor unit 161 and a reference reflective plate 162. A hinge part 161a may be provided to one side of the density sensor unit 161 so that the density sensor unit 161 rotates with respect to the hinge part 161a.

The image forming apparatus according to an embodiment develops an image in the development unit 110 when image data are received from the outside. In detail, when exposure units 111 to 114 radiate light to photoreceptors 115 to 118, an electrostatic latent image is formed on the photoreceptors 115 to 118, and when a developer containing toner is supplied to the electrostatic latent image, developer particles are charged and adhere to surfaces of the photoreceptors 115 to 118 to thereby form an image. FIG. 1 illustrates four exposure units 111 to 114 and four photoreceptors 115 to 118 since an image forming apparatus for forming a color image is typically provided with photoreceptors and exposure units for four colors of CMYK, i.e. cyan, magenta, yellow, and black, but the image forming apparatus according to an embodiment is not limited thereto.

The image formed on the photoreceptors 115 to 118 is transferred from the primary transfer unit 120a to an intermediate transfer belt 127. Images for respective colors of cyan, magenta, yellow, and black may be sequentially transferred to the intermediate transfer belt 127 circulated by intermediate transfer rollers 125 and 126 so as to complete a single color image. The color image formed on the intermediate transfer belt 127 is transferred to a printing medium 102 supplied from the secondary transfer unit 120b. Although the drawing illustrates an indirect transfer method in which an image is firstly transferred from the photoreceptors 115 to 118 to the intermediate transfer belt 127 and then is secondly transferred from the intermediate transfer belt 127 to the printing medium 102, the image may also be directly transferred from the photoreceptors to the printing medium. The intermediate transfer belt 127 and the printing medium 102, to which images are transferred, may be collectively referred to as a transfer medium.

The printing medium 102 to which an image has been transferred is transported to the fusing unit 130 along a printing medium transport path 106 and is heated and pressed by fusing rollers 131 and 132. Therefore, an image is fused to the printing medium 102, and thus an image forming process is finished.

A transfer process performed in the transfer unit 120 during the image forming process is described in detail as follows: To transfer the image formed on the photoreceptors 115 to 118 to the intermediate transfer belt 127, primary transfer rollers 121 to 124 are supplied with transfer power from the power supply unit 140 in order to apply a transfer voltage to the developer particles on the surfaces of the photoreceptors 115 to 118. That is, when a voltage, of which a polarity is opposite to that of the charged developer particles on the surfaces of the photoreceptors 115 to 118, is applied to each of the primary transfer rollers 121 to 124, the developer particles on the surfaces of the photoreceptors 115 to 118 are moved to the intermediate transfer belt 127 by electrostatic force. Likewise, in the secondary transfer unit 120b, when a secondary transfer roller 128 is supplied with transfer power from the power supply unit 140 in order to apply a voltage of which a polarity is opposite to that of the charged developer particles on the intermediate transfer belt 127, the developer particles are moved from the intermediate transfer belt 127 to a surface of the printing medium 102 transported through the printing medium transport path 106.

A density of a transferred image is determined by the transfer power. However, due to various environmental factors, such as temperature and humidity, an intended density of an image may not match with a density of an actually outputted image. Therefore, in order to output an image with desired density, density compensation is performed. The density compensation is performed by using the detection unit 160 as described below.

Figure 3:
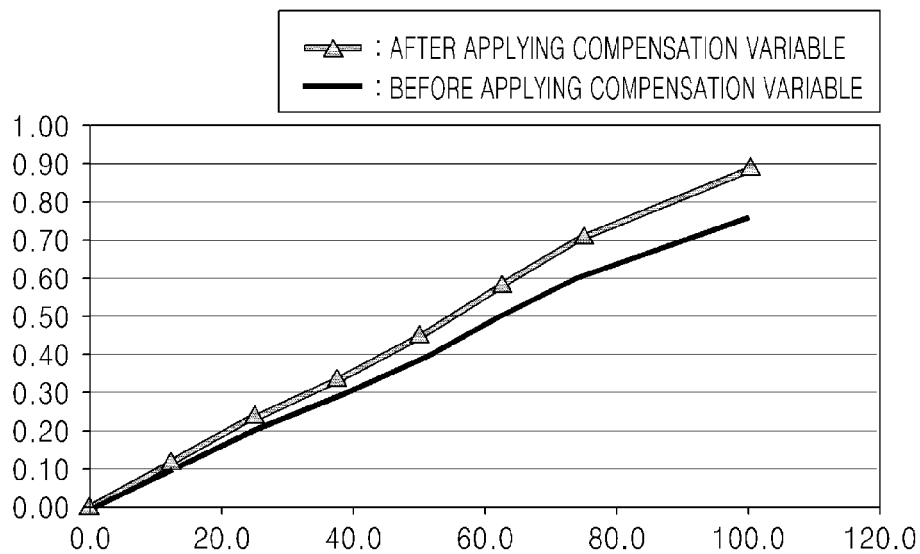
FIG. 3 is a diagram illustrating an image curve formed by using values of Table 1.

Sample patches with various coverages are formed on the intermediate transfer belt 127, and a density of the samples patches is sensed by the density sensor unit 161. When sensing of the density of the sample patches is completed, an image curve is formed by using density sensing values according to the coverages of the sample patches. FIG. 3 illustrates an example of the image curve. In FIG. 3, the horizontal axis represents the coverages of the sample patches and the vertical axis represents the density of the sample patches. The two illustrated curves are image curves. When the image curve is formed, a slope of the image curve is calculated. Then, according to a result of comparing the calculated slope with a predetermined (i.e. pre-stored) reference slope, the control unit 150 controls the power supply unit 140 to adjust the transfer power supplied to the primary and secondary transfer units 120a and 120b.

Here, the reference slope compared with the calculated slope of the image curve is a slope of an image curve formed by using reference density values of the sample patches according to the coverages of the sample patches. The reference density value is obtained through density sensing when the sample patches are formed with desired density.

However, in the case where the density compensation is performed by the density sensor unit 161, due to a longitudinal change caused by contamination of a sensor or due to a life of the sensor, a sensing capability of the sensor may vary, and thus the density compensation may not be correctly performed. That is, since the density sensed by the density sensor unit 161 is different from the actual density of the sample patches, the density compensation may not be correctly performed. To overcome this limitation, a sensing value of the density sensor unit 161 needs to be compensated. The reference reflective plate 162 and the hinge part 161a included in the detection unit 160 of the image forming apparatus according to an embodiment are used to compensate the sensing value of the density sensor unit 161.

Figure 2A:
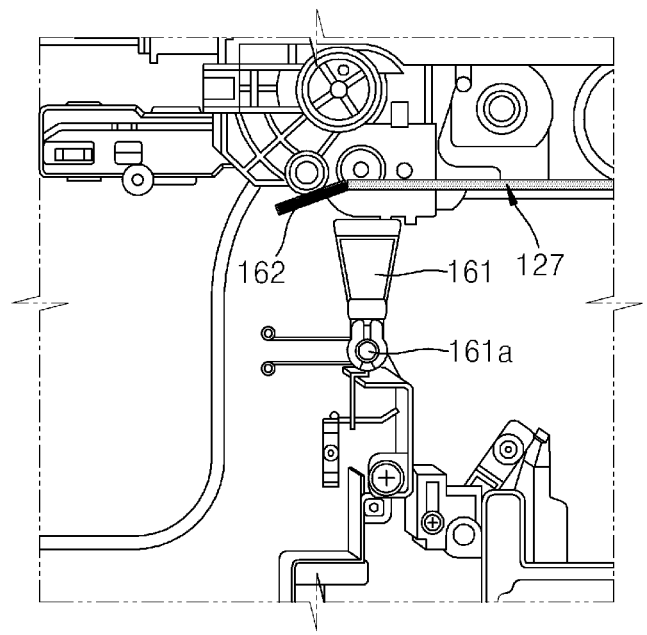
FIGS. 2A and 2B are diagrams illustrating motion of a density sensor unit rotating with respect to a hinge part in detail.
Figure 2B:
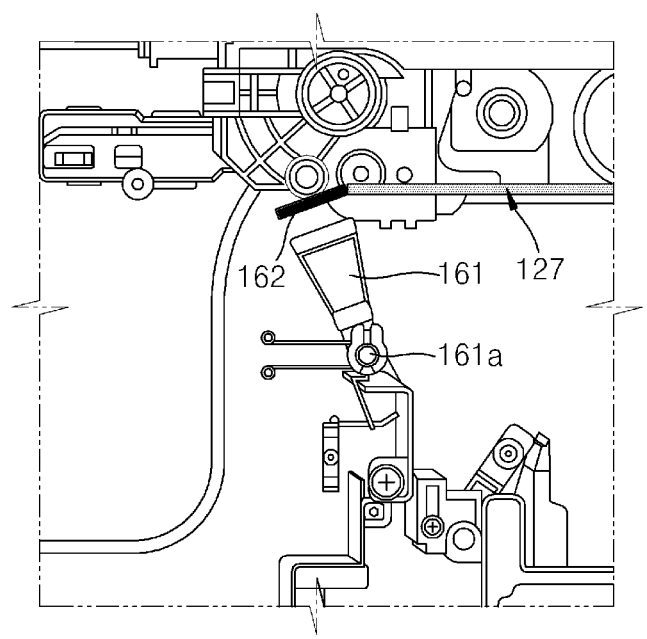

FIGS. 2A and 2B are diagrams in detail illustrating motion of the density sensor unit 161 rotating with respect to the hinge part 161a. Referring to FIG. 2A, the density sensor unit 161 is located at a position facing the intermediate transfer belt 127, and the hinge part 161a is provided to one side of the density sensor unit 161. The reference reflective plate 162 is provided to a side of the intermediate transfer belt 127 at a certain angle. At the position illustrated in FIG. 2A, the density sensor unit 161 may sense the density of the sample patches formed on the intermediate transfer belt 127. FIG. 2B illustrates that the density sensor unit 161 rotates with respect to the hinge part 161a in order to sense the density of the reference reflective plate 162.

The density sensor unit 161 compensates the sensing value as described below. The hinge part 161a is provided to one side of the density sensor unit 161, and the density sensor unit 161 is capable of rotating with respect to the hinge part 161a. The density sensor unit 161 may rotate from a position for sensing the density of the image formed on the intermediate transfer belt 127 to a position for sensing the density of the reference reflective plate 162. After the density sensor unit 161 is moved to the position for sensing the density of the reference reflective plate 162 through a rotation, the density sensor unit 161 senses the density of the reference reflective plate 162.

Referring to FIG. 1, a distance d1 between the density sensor unit 161 and the intermediate transfer belt 127 when the density sensor unit 161 is located at the position facing the intermediate transfer belt 127 may be the same as a distance d2 between the density sensor unit 161 and the reference reflective plate 162 when the density sensor unit 161 is located at the position facing the reference reflective plate 162 so that sensing errors due to a difference between amounts of received light according to the distances may be reduced.

Although FIG. 1 illustrates that the density sensor unit 161 rotates with respect to the hinge part 161a so that the density sensor unit 161 faces one of the intermediate transfer belt 127 and the reference reflective plate 162, the density sensor unit 161 may be moved by using a sliding mechanism.

The reference reflective plate 162 is for compensating a sensing value for a color image, i.e. for performing calibration for diffused reflection waves. The reference reflective plate 162 may be a matt reflective plate having a rough surface. The reference reflective plate 162 may have brightness of N3.5 or more of the Munsell color system.

If the density sensor unit 161 senses the density of the reference reflective plate 162, the sensor compensation unit 152 compares a sensing value with a reference value to calculate a compensation variable. The compensation variable is obtained by dividing the reference value by an actual sensing value. For instance, when the reference value of the reference reflective plate 162 is 350 and the actual sensing value obtained by sensing the reference reflective plate 162 by the density sensor unit 161 is 318, the compensation variable is about 1.1. The reference value may be stored in a storage unit (not illustrated) included in the image forming apparatus, and the calculated compensation variable may also be stored in the storage unit.

When the compensation variable is calculated, the density sensor unit 161 rotates again with respect to the hinge part 161a to sense the density of the sample patches formed on the intermediate transfer belt 127. When the sensing of the density of the sample patches is completed, the density compensation unit 151 applies the compensation variable to the density of the sensed sample patches to form an image curve. Thereafter, the density compensation unit 151 calculates a slope of the formed image curve, and compares the calculated slope with the reference slope to control the control unit 140 so that transfer power is adjusted.

In detail, the density compensation unit 151 multiplies the density of the sensed sample patches by the compensation variable to form the image curve. Table 1 below shows actual sensing values and compensation-variable-applied sensing values according to the coverages of the sample patches when the compensation variable is 1.17.

TABLE 1

| Coverage | Reference | Sensing value | Compensation variable | Compensated sensing value |
|---|---|---|---|---|
| 0.0 | 0.00 | 0.00 | 1.17 | 0.00 |
| 12.5 | 0.12 | 0.10 | 1.17 | 0.12 |
| 25.0 | 0.24 | 0.20 | 1.17 | 0.25 |
| 37.5 | 0.34 | 0.28 | 1.17 | 0.33 |
| 50.0 | 0.45 | 0.38 | 1.17 | 0.45 |
| 62.5 | 0.59 | 0.50 | 1.17 | 0.58 |
| 75.0 | 0.71 | 0.60 | 1.17 | 0.71 |
| 100.0 | 0.89 | 0.76 | 1.17 | 0.89 |

Referring to Table 1, the actual sensing values of the sample patches are a little bit different from the reference density values. However, the sensing values to which the compensation variable calculated during the sensing value compensation process of the density sensor unit 161 is applied are almost the same as the reference density values. That is, the actual density of the image transferred to the transfer medium is almost the same as the reference density value, but the sensing value obtained by sensing the density of the sample patches does not match with the actual density of the sample patches due to a problem of the density sensor unit 161. Image curves obtained by using the values of Table 1 are illustrated in FIG. 3.

Referring to FIG. 3, an image curve obtained before applying the compensation variable and an image curve obtained after applying the compensation variable are illustrated. A slope of the image curve obtained after applying the compensation variable is calculated and compared with the reference slope in order to perform the density compensation. The reference slope is a slope of the image curve obtained by using the reference density values of Table 1.

Here, the mode, in which the compensating of the sensing value of the density compensation unit 161 is performed, is referred to as a sensor compensation mode and the mode, in which the density of the image transferred to the transfer medium is compensated according to the value obtained by sensing the density of the sample patches, is referred to as a density compensation mode. By performing the sensor compensation mode right before performing the density compensation mode, errors that may occur due to environmental factors, such as temperature, may be minimized.

Figure 4:
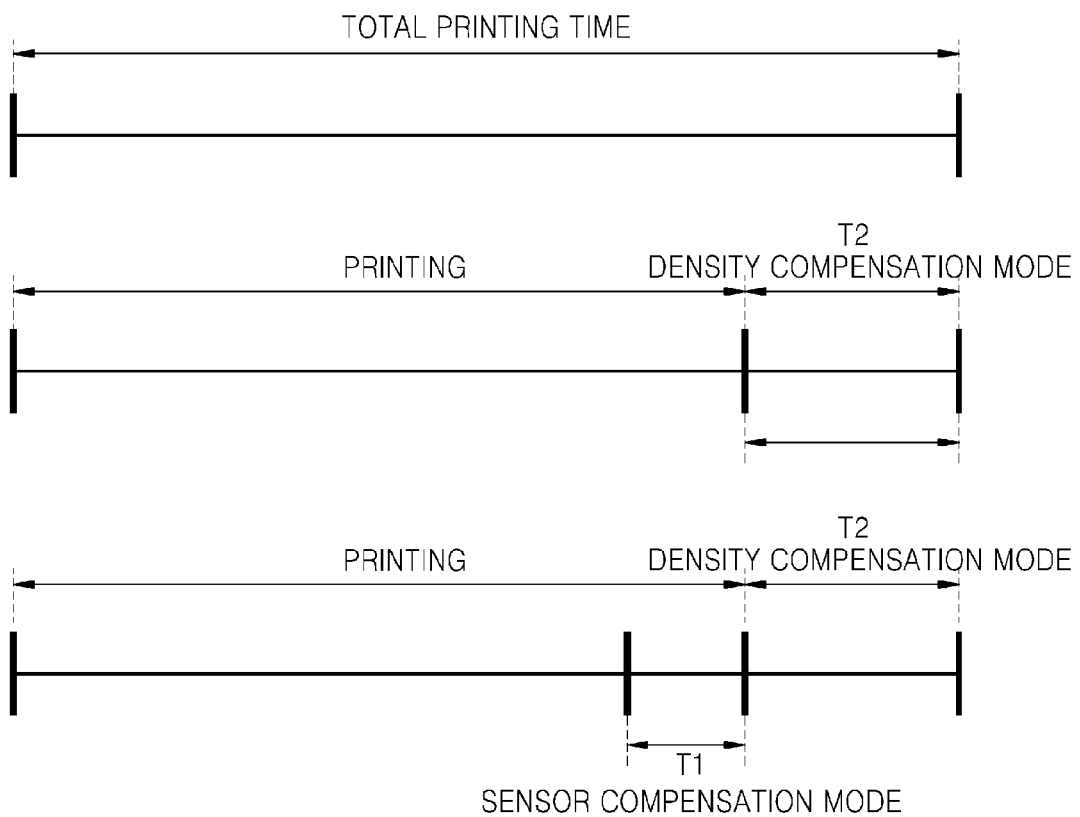
FIG. 4 is a diagram illustrating a total printing time considering operations of density compensation and sensor compensation.

Since printing paper contacts the intermediate transfer belt 127 while printing data is printed, the density compensation mode, which requires the sample patches to be formed on the intermediate transfer belt 127, cannot be performed. However, the sensor compensation mode may be performed even while the printing is performed since the sensor compensation mode may be performed just by rotating the density sensor unit 161 to face the reference reflective plate 162. Therefore, to minimize an increase in a total printing time, the sensor compensation mode may be performed while the printing is performed. FIG. 4 is a diagram illustrating the total printing time considering the operations of the density compensation and sensor compensation. As illustrated in FIG. 4, by performing the sensor compensation mode that requires a time T1 while the printing is performed right before performing the density compensation mode that requires a time T1, the total printing time may be the same regardless of the performance of the sensor compensation mode.

Figure 5:
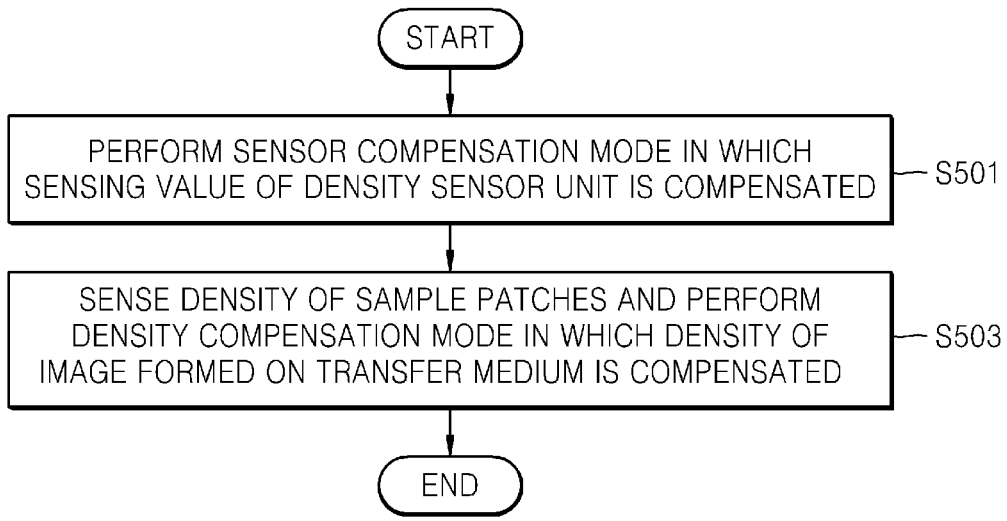
Figure 6:
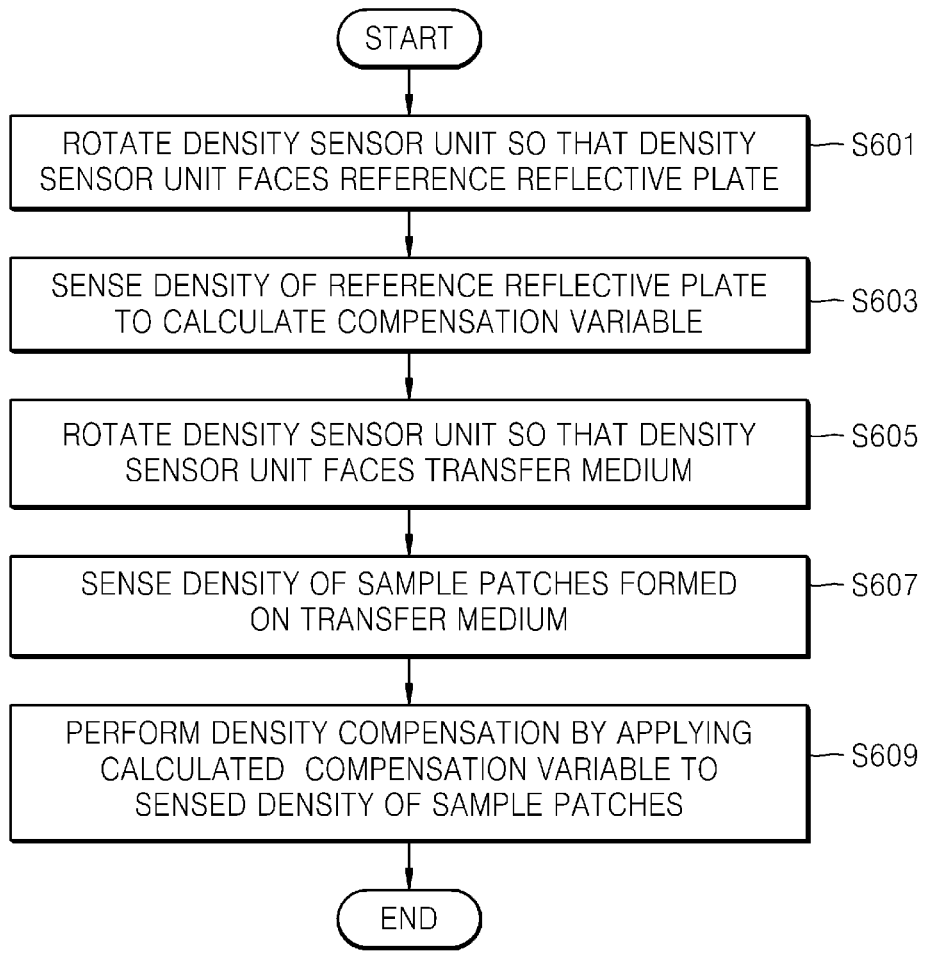

FIGS. 5 to 7 are flowcharts illustrating a method of compensating density, according to an embodiment.

Referring to FIG. 5, in operation S501, the sensor compensation mode for compensating the sensing value of the density sensor unit is performed. Thereafter, in operation S503, the density of the sample patches formed on the transfer medium may be sensed, and the density of the image formed on the transfer medium may be compensated by applying a result of the sensor compensation mode, so that the density compensation mode is performed. Here, when the sensor compensation mode is performed in operation S501, the density sensor unit is positioned so as to face the reference reflective plate, and when the density compensation mode is performed in operation S503, the density sensor unit is positioned so as to face the transfer medium. The density sensor unit may be configured so as to rotate with respect to the hinge part provided to one side of the density sensor unit. The density compensation mode of operation S501 may be performed while a printing mode, in which printing data is printed, is performed.

Referring to FIG. 6, in operation S601, the density sensor unit is rotated so as to face the reference reflective plate, and in operation S603, the density of the reference reflective plate is sensed by the density sensor unit and the sensing value is compared with the reference value to calculate the compensation variable. In detail, the compensation variable may be obtained by dividing the reference value by the value obtained by sensing the density of the reference reflective plate. When the calculating the compensation variable is completed, in operation S605, the density sensor unit is rotated so as to face the transfer medium, and in operation S607, the density of the sample patches formed on the transfer medium is sensed. Thereafter, in operation S609, the calculated compensation variable is applied to the sensed density of the sample patches in order to perform the density compensation. In detail, the density compensation is performed by using a value obtained by multiplying the sensed density of the sample patches by the compensation variable.

Referring to FIG. 7, in operation S701, the density sensor unit is rotated so as to face the reference reflective plate, and in operation S703, the density of the reference reflective plate is sensed. Then, in operation S705, the sensed density value of the reference reflective plate is compared with the reference value to calculate the compensation variable. In operation S707, it is determined whether the calculated compensation variable is the same as the compensation variable predetermined (i.e. pre-stored) in a memory of the image forming apparatus. When the image forming apparatus is manufactured, the compensation variable may be stored as 1. If the calculated compensation variable does not match with the predetermined compensation variable according to a result of the determination of operation S707, the method proceeds to operation S708 in order to update the compensation variable. Otherwise, if the calculated compensation variable matches with the predetermined compensation variable, the method proceeds to operation S709. In operation S709, the density sensor unit is rotated so as to face the transfer medium. In operation S711, the sample patches are formed on the transfer medium, and in operation S713, the formed sample patches are sensed to output a sensing value. In operation S715, the stored compensation variable is applied to the sensing value outputted in operation S713 so as to form an image curve. The method of forming the image curve has been described in detail with reference to FIG. 3. In operation S717, a slope of the image curve obtained in operation S715 is calculated, and the calculated sloped is compared with the reference slope. In operation S719, according to a result of the slope comparison, the transfer power is controlled to thereby perform the density compensation.

As described above, by using the density sensor unit that can be positioned to face the transfer medium or the reference reflective plate, the sensor compensation mode and the density compensation mode are performed, and thus the sensing errors that may occur during the density compensation can be minimized.

While the present disclosure has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. An image forming apparatus comprising:
a transfer unit configured to transfer an image formed on a photoreceptor to a transfer medium;
a power supply unit configured to supply transfer power to the transfer unit; a density sensor configured to sense a density of the image transferred to the transfer medium;
a stationary reference reflective plate, separate from the density sensor, configured to be sensed by the density sensor; and
a control unit configured to control the power supply unit so that the transfer power supplied to the transfer unit is adjusted, wherein the density sensor is allowed to move from a first position for sensing a density of sample patches formed on the transfer medium to a second position for sensing a density of the stationary reference reflective plate,
the density sensor rotates with respect to a hinge provided to one side of the density sensor to move from the first position to the second position, and
the control unit performs a sensor compensation mode, in which a sensing value of the density sensor is compensated according to the density of the stationary reference reflective plate sensed by the density sensor at the second position, and performs a density compensation mode in which the transfer power supplied to the transfer unit is adjusted according to the density of the sample patches sensed by the density sensor at the first position to thereby compensate the density of the image transferred to the transfer medium.

2. The image forming apparatus of claim 1, wherein the control unit is configured to compare the density of the stationary reference reflective plate sensed by the density sensor at the second position with a reference value and calculate a compensation variable; and perform density compensation by applying the calculated compensation variable to the density of the sample patches sensed by the density sensor at the first position.

3. The image forming apparatus of claim 2, wherein the control unit generates an image curve by using a value obtained by applying the compensation variable to the density of the sample patches, and controls the power supply unit so that the transfer power is adjusted according to a result of comparing a slope of the image curve with a predetermined reference slope.

4. The image forming apparatus of claim 2, wherein the control unit calculates the compensation variable by dividing the reference value by the sensed density of the stationary reference reflective plate, and performs the density compensation by using a value obtained by multiplying the sensed density of the sample patches by the compensation variable.

5. The image forming apparatus of claim 2, further comprising a storage unit configured to store the compensation variable, wherein, when the compensation variable calculated by the control unit does not match with the compensation variable stored in the storage unit, the compensation variable stored in the storage unit is updated.

6. The image forming apparatus of claim 1, wherein the control unit performs the sensor compensation mode while a printing mode in which printing data is printed is performed.

7. The image forming apparatus of claim 1, wherein the control unit performs the sensor compensation mode right before performing the density compensation mode.

8. The image forming apparatus of claim 1, wherein the stationary reference reflective plate has brightness of N3.5 or more of the Munsell color system.

9. An image forming apparatus comprising:
a transfer unit configured to transfer an image formed on a photoreceptor to a transfer medium;
a power supply unit configured to supply transfer power to the transfer unit; a density sensor configured to sense a density of the image transferred to the transfer medium; and
a control unit configured to control the power supply unit so that the transfer power supplied to the transfer unit is adjusted, wherein
the density sensor is allowed to move from a first position for sensing a density of sample patches formed on the transfer medium to a second position for sensing a density of a stationary reference reflective plate,
the density sensor rotates with respect to a hinge provided to one side of the density sensor to move from the first position to the second position,
the control unit performs a sensor compensation mode, in which a sensing value of the density sensor is compensated according to the density of the stationary reference reflective plate sensed by the density sensor at the second position, and performs a density compensation mode in which the transfer power supplied to the transfer unit is adjusted according to the density of the sample patches sensed by the density sensor at the first position to thereby compensate the density of the image transferred to the transfer medium, and
a distance between the density sensor and the transfer medium when the density sensor is located at the first position is the same as that between the density sensor and the stationary reference reflective plate when the density sensor is located at the second position.

10. A method of compensating density for an image forming apparatus comprising a transfer unit, a density sensor, and a stationary reference reflective plate separate from the density sensor, the method comprising:
performing a sensor compensation mode in which a sensing value of the density sensor is compensated; and
performing a density compensation mode in which a density of an image formed on a transfer medium is compensated according to a result of sensing a density of sample patches formed on the transfer medium by using the density sensor,
wherein the density sensor is located at a first position for sensing the density of the sample patches formed on the transfer medium when the density compensation mode is performed, and is located at a second position for sensing a density of the stationary reference reflective plate when the sensor compensation mode is performed, and
wherein the density sensor rotates with respect to a hinge provided to one side of the density sensor to move from the first position to the second position.

11. The method of claim 10, wherein the performing of the sensor compensation mode comprises:
moving the density sensor from the first position to the second position;
sensing the density of the stationary reference reflective plate; and
comparing the sensed density of the stationary reference reflective plate with a reference value to calculate a compensation variable.

12. The method of claim 11, wherein the performing of the density compensation mode comprises:

moving the density sensor from the second position to the first position;

forming the sample patches on the transfer medium;

sensing the density of the formed sample patches;

applying the calculated compensation variable to the sensed density of the sample patches; and compensating the density of the image formed on the transfer medium by adjusting transfer power according to the density of the sample patches to which the compensation variable is applied.

13. The method of claim 12, wherein the compensating of the density of the image comprises:

generating an image curve by using a value obtained by applying the compensation variable to the density of the sample patches;

comparing a slope of the image curve with a predetermined reference slope; and adjusting the transfer power according to a result of the comparison.

14. The method of claim 12, wherein the calculating of the compensation variable comprises dividing the reference value by the sensed density of the stationary reference reflective plate, and the compensating of the density of the image comprises multiplying the sensed density of the sample patches by the compensation variable.

15. The method of claim 11, wherein, when the calculated compensation variable does not match with a predetermined compensation variable, the predetermined compensation variable is updated.

16. The method of claim 10, wherein the sensor compensation mode is performed while a printing mode in which printing data is printed is performed.

17. A non-transitory computer-readable recording medium for recording a program for executing a method of claim 10 in a computer.

18. A method of compensating density for an image forming apparatus, the method comprising:

performing a sensor compensation mode in which a sensing value of a density sensor is compensated; and performing a density compensation mode in which a density of an image formed on a transfer medium is compensated according to a result of sensing a density of sample patches formed on the transfer medium by using the density sensor, wherein the density sensor is located at a first position for sensing the density of the sample patches formed on the transfer medium when the density compensation mode is performed, and is located at a second position for sensing a density of a stationary reference reflective plate when the sensor compensation mode is performed, the density sensor rotates with respect to a hinge provided to one side of the density sensor to move from the first position to the second position, and a distance between the density sensor and the transfer medium when the density sensor is located at the first position is the same as that between the density sensor and the stationary reference reflective plate when the density sensor is located at the second position.

19. A method of compensating density for an image forming apparatus comprising a transfer unit, a density sensor, and a stationary reference reflective plate, the method comprising:

calibrating the density sensor; and compensating a density of an image formed on a transfer medium according to a result of sensing a density of sample patches formed on the transfer medium by using the density sensor, wherein the density sensor is located at a first position for sensing the density of the sample patches formed on the transfer medium when a density compensation mode is performed, and is located at a second position for sensing a density of the stationary reference reflective plate when calibrating, the density sensor rotates with respect to a hinge provided to one side of the density sensor to move from the first position to the second position, and a distance between the density sensor located at the second position and the stationary reference reflective plate and a distance between the density sensor located at the first position and the transfer medium are substantially the same, to reduce sensing error due to a difference between amounts of received light according to the distances.

* * * * *